US012693190B2

(12) United States Patent

He et al.

(10) Patent No.: US 12,693,190 B2

(45) Date of Patent: Jul. 28, 2026

(54) HORIZONTAL AXIAL ANGULAR VIBRATION DEVICE

(71) Applicant: Zhejiang University, Hangzhou (CN)

(72) Inventors: Wen He, Hangzhou (CN); Zeyu Yuan, Hangzhou (CN); Jie Zhou, Hangzhou (CN); Shushi Jia, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 379 days.

(21) Appl. No.: 18/233,363

(22) Filed: Aug. 14, 2023

(65) Prior Publication Data

US 2024/0241010 A1 Jul. 18, 2024

(30) Foreign Application Priority Data

Dec. 31, 2022 (CN) .......................... 202211736155.2
Dec. 31, 2022 (CN) .......................... 202211740278.3
Dec. 31, 2022 (CN) .......................... 202211740606.X

(51) Int. Cl.
G01M 7/04 (2006.01)
G01M 7/02 (2006.01)

(52) U.S. Cl.
CPC .............. G01M 7/045 (2013.01); G01M 7/02 (2013.01)

(58) Field of Classification Search
CPC ................................ G01M 7/045; G01M 7/02

USPC .......................................................... 73/663
See application file for complete search history.

(56) References Cited

U.S. PATENT DOCUMENTS

| | | | | |
|---|---|---|---|---|
| 6,543,289 | B1* | 4/2003 | Jinzenji ................. | G01M 7/045 |
| | | | | 73/668 |
| 9,954,424 | B2* | 4/2018 | He .......................... | B06B 1/045 |
| 2006/0075819 | A1* | 4/2006 | Peng ..................... | G01M 7/027 |
| | | | | 73/571 |
| 2021/0168530 | A1* | 6/2021 | Qi .......................... | G10K 11/178 |

FOREIGN PATENT DOCUMENTS

| | | | | | |
|---|---|---|---|---|---|
| CN | 100405020 | C | * | 7/2008 | |
| CN | 103674455 | A | * | 3/2014 | |
| CN | 204007681 | U | * | 12/2014 | |
| CN | 204064332 | U | * | 12/2014 | |
| CN | 103674455 | B | | 6/2016 | |
| CN | 210774755 | U | * | 6/2020 | |
| CN | 218341381 | U | * | 1/2023 | |
| CN | 116105953 | A | * | 5/2023 | .............. G01M 7/02 |
| CN | 118720895 | A | * | 10/2024 | .............. B24B 47/12 |

* cited by examiner

*Primary Examiner* — Peter J Macchiarolo
*Assistant Examiner* — Monica S Young

(57) ABSTRACT

The present invention discloses a horizontal axial angular vibration device, comprising a base; a moving component, at least comprising a table surface for disposing a test equipment and a main shaft connected to the table surface to drive the table surface to rotate; a driving component, associated with the table surface and/or main shaft to drive the table surface to swing around the axis of the main shaft; the axis of the main shaft is horizontally disposed.

20 Claims, 13 Drawing Sheets

561

523

56

533

53

54

532

542

511

541

531

HORIZONTAL AXIAL ANGULAR VIBRATION DEVICE

CROSS REFERENCE TO RELATED APPLICATIONS

The present application claims the benefit of Chinese Patent Application Nos. 202211736155.2, 202211740278.3 and 202211740606.X filed on Dec. 31, 2022. All the above are hereby incorporated by reference in their entirety.

FIELD OF THE INVENTION

The present invention belongs to the technical field of angular vibration tables, particularly to a horizontal axial angular vibration device.

BACKGROUND OF THE INVENTION

With the development of modern science and technology, angular vibration sensors are more and more widely used in various fields of national economic life, such as deep sea exploration, resource exploration, aerospace, medical equipment, automobile industry and household appliances. Angular vibration sensors need to be standardized before delivery from the factory and need to be calibrated after use for a period of time or after repair. As one of the key equipment for the standardization or calibration of the dynamic performance of the angular vibration sensors, angular vibration tables have attracted more and more attention. In addition, angular vibration tables can also be used for angular vibration environmental testing of various products.

Traditional angular vibration tables adopt DC torque motors as the driving elements; the motor torque output shaft is connected and fixed to the main shafts of moving components. When an alternating current is applied to a DC torque motor, the alternating torque generated by the motor acts on the moving component, thereby making the moving component to generate angular vibration. Due to the influence of the time constant of the motor, the operating frequency range of this type of angular vibration tables using a DC torque motor is generally below 100 Hz; besides, because of the large friction force of the mechanical bearing and the uneven magnetic field inside the motor, the degree of distortion of the angular vibration waveform output by the vibration table is relatively large even if a brushless DC torque motor is used.

In recent years, in order to overcome the shortcomings of the angular vibration table with a motor as a driving element, non-motor-driven coil excitation drive type angular vibration table has been gradually proposed. For example, the Chinese Patent No. CN200610099078.9 discloses a non-motor electric angular vibration table. The excitation system of the angular vibration table is composed of a base made of electric pure iron, the outer wall of the magnetic core, and the yoke and the excitation coil. Wiring troughs are evenly distributed on the moving coil skeleton, the driving wires are tightly wrapped with insulating tape, inserted into the wiring troughs on the moving coil skeleton, dipped in paint and cured under high pressure; the wires protrude from both ends of troughs and are welded with braided soft wires. The main shaft is of a hollow cylindrical cup structure, and the two ends of which are respectively connected to the moving coil and the table surface. The main shaft is covered with a rubber sleeve, and both ends of the rubber sleeve are respectively bonded to the support base and the table surface with superglue, and the moving coil is arranged between the magnetic core and the yoke. This kind of angular vibration table generates a magnetic field from the magnet exciting coil, and an alternating current is switched on to the moving coil located in the air gap magnetic field. Under the action of electromagnetic coupling between the moving coil and the magnetic field, the moving coil generates an alternating torque, thereby causing the table surface connected to the moving coil to generate angular vibration. This type of angular vibration tables has the following disadvantages: 1) The winding of the moving coil is difficult, the wiring is uneven, and the process is complicated; 2) The inertia of the rotating parts is large, and the operating frequency range is narrow; 3) Since the rubber cylinder spring is used as the restoring spring of the driving component, the range of rotation angle is limited, the angular displacement is small, and the degree of distortion of the angular acceleration waveform is large.

An angular vibration device described in Chinese patent CN201420503770.3 includes a shell, a table surface, a main shaft driving the table surface to rotate, a first moving coil assembly, a magnetic circuit assembly, an air bearing, and an angular displacement sensor. When the angular vibration device is working, an alternating current is switched on to the coil, and the coil generates an Ampere force under the action of the magnetic field, so that the first moving coil assembly vibrates back and forth around the equilibrium position under the action of the Ampere force. This angular vibration device solves the problems existing in the above angular vibration tables; however, the rotation axes of all the above types of angular vibration tables are perpendicular to the table surface of the angular vibration table or parallel to the direction of the acceleration of gravity.

There are two types of angular vibration sensors: one type is that the sensitive shaft is perpendicular to the mounting surface; the other type is that the sensitive shaft is parallel to the mounting surface, and the mounting surface is generally horizontal. An angular vibration table whose rotation axis is perpendicular to the table surface or parallel to the direction of the acceleration of gravity can only be used to calibrate an angular vibration sensor whose sensitive rotation axis is perpendicular to the mounting surface. If it is used to calibrate an angular vibration sensor whose sensitive shaft is parallel to the mounting surface, the mounting surface must be disposed perpendicular to the table surface of the angular vibration table. However, this is inconsistent with its actual working state; together with the influence of additional tooling, a large calibration error may be produced. For angular vibration sensors whose sensitive rotation axis is parallel to the mounting surface, an angular vibration table whose rotation axis is parallel to the table surface must be used. In addition, the angular vibration environmental test of products used to simulate the horizontal and axial rotational degrees of freedom also requires an angular vibration table whose rotation axis is parallel to the table surface; meanwhile, an angular vibration table whose rotation axis is parallel to the table surface can also be used to dynamically calibrate the linear acceleration sensor in the gravitational field. At present, there is no angular vibration table for calibration whose rotation axis is parallel to the table surface on the market.

SUMMARY OF THE INVENTION

In order to achieve the above object, the present invention adopts the following technical solutions: a horizontal axial angular vibration device, comprising a base;

a moving component, at least comprising a table surface for disposing a test equipment and main shaft connected to the table surface to drive the table surface to rotate;

wherein:

further comprising:

a driving component, associated with the table surface and/or main shaft to drive the table surface to swing around the axis of the main shaft;

the axis of the main shaft is horizontally disposed.

In summary, the present invention has the following beneficial effects:

The main shaft of the present invention is disposed horizontally, driven by a driving component, and a table surface for disposing a test equipment makes angular vibration around a rotating shaft in parallel, achieving excitation of the test equipment (for example, an angular vibration sensor) of a sensitive rotating shaft parallel to an mounting surface, and thus achieving a dynamic calibration of the angular vibration sensor whose sensitive rotating shaft is parallel to the mounting surface under the actual mounting conditions, thereby obtaining the amplitude-frequency characteristic and phase-frequency characteristic of the sensor; thus, the angular vibration device of the present invention can be used for dynamic calibration of angular vibration sensors whose sensitive rotating shafts are parallel to the mounting surface.

DETAILED DESCRIPTION

In order to enable those skilled in the art to better understand the technical solutions of the present invention, the technical solutions in the embodiments of the present invention will be clearly and completely described below in conjunction with the accompanying drawings in the embodiments of the present invention.

Example 1

Figures 1, 2:
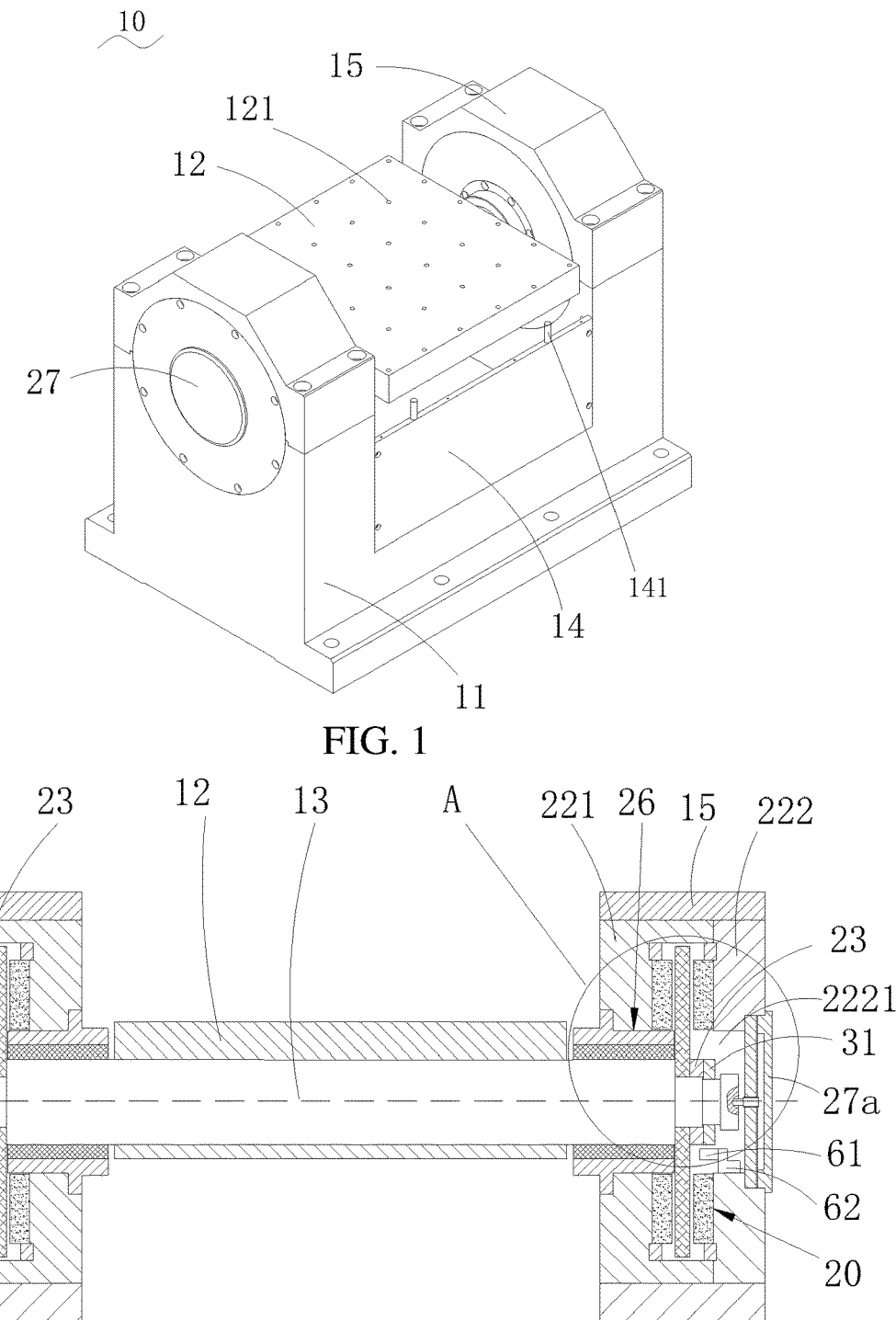
FIG. 1 is a perspective view of Example 1 of the present invention.
FIG. 2 is a cross-sectional view of Example 1 of the present invention.

Referring to FIG. 1 and FIG. 2, a horizontal axial angular vibration device 10 includes a base 11, a moving component and a first driving component 20; the moving component moves under the drive of the first driving component 20, and the moving component includes at least a table surface 12 and a main shaft 13; the table surface 12 is used as a working plane for disposing test equipment, and the surface thereof is evenly distributed with a plurality of threaded holes 121 for mounting test equipment; the axis of the main shaft 13 is disposed horizontally, and the main shaft 13 rotates back and forth under the drive of the first driving component 20, and the main shaft 13 penetrates through the table surface 12 and is fixedly connected to the table surface 12 to drive the table surface 12 to swing, so that the table surface 12 will have an output of angular momentum to excite the test equipment. The test equipment can be an angular vibration sensor whose sensitive axis of rotation is parallel to the mounting surface, or other equipment with a sensitive axis of rotation parallel to the mounting surface.

The main shaft 13 of the present invention is disposed horizontally, and then the table surface 12 of the test equipment is disposed to perform angular vibration around the main shaft 13 parallel to the table surface, to realize the excitation of the test equipment (for example, an angular vibration sensor) whose sensitive rotating shaft is parallel to the mounting surface, so that the angular vibration device 10 of the present invention can be used to dynamically calibrate the angular vibration sensor whose sensitive rotation axis is parallel to the mounting surface.

Referring to FIG. 1 and FIG. 2, two groups of the first driving components 20 are provided, which are mounted on the base 11 respectively; the two groups of the first driving components 20 are symmetrically arranged at both ends of the main shaft 13, output the torque to the main shaft 13, reduce the rotation error of the main shaft 13, and improve the driving capability of the angular vibration device 10. Certainly, in other embodiments, only one group of the first driving components 20 are provided, which are associated with one end of the main shaft 13; the other end of the main shaft 13 is directly and rotatably arranged on the base 11 through the bearing 26, which is driven to rotate by a group of the first driving components 20.

Referring to FIG. 1, the base 11 is symmetrically provided with side plates 14 on both sides to protect the space below the table surface. A limiting block 141 is fixed on the top of the side plate 14, and the limiting block 141 is arranged under the table surface 12 and maintains an appropriate height difference with the table surface. By setting the limiting block, the swing range of the table surface is limited. Specifically, each side plate is provided with two limiting blocks.

Figure 3:
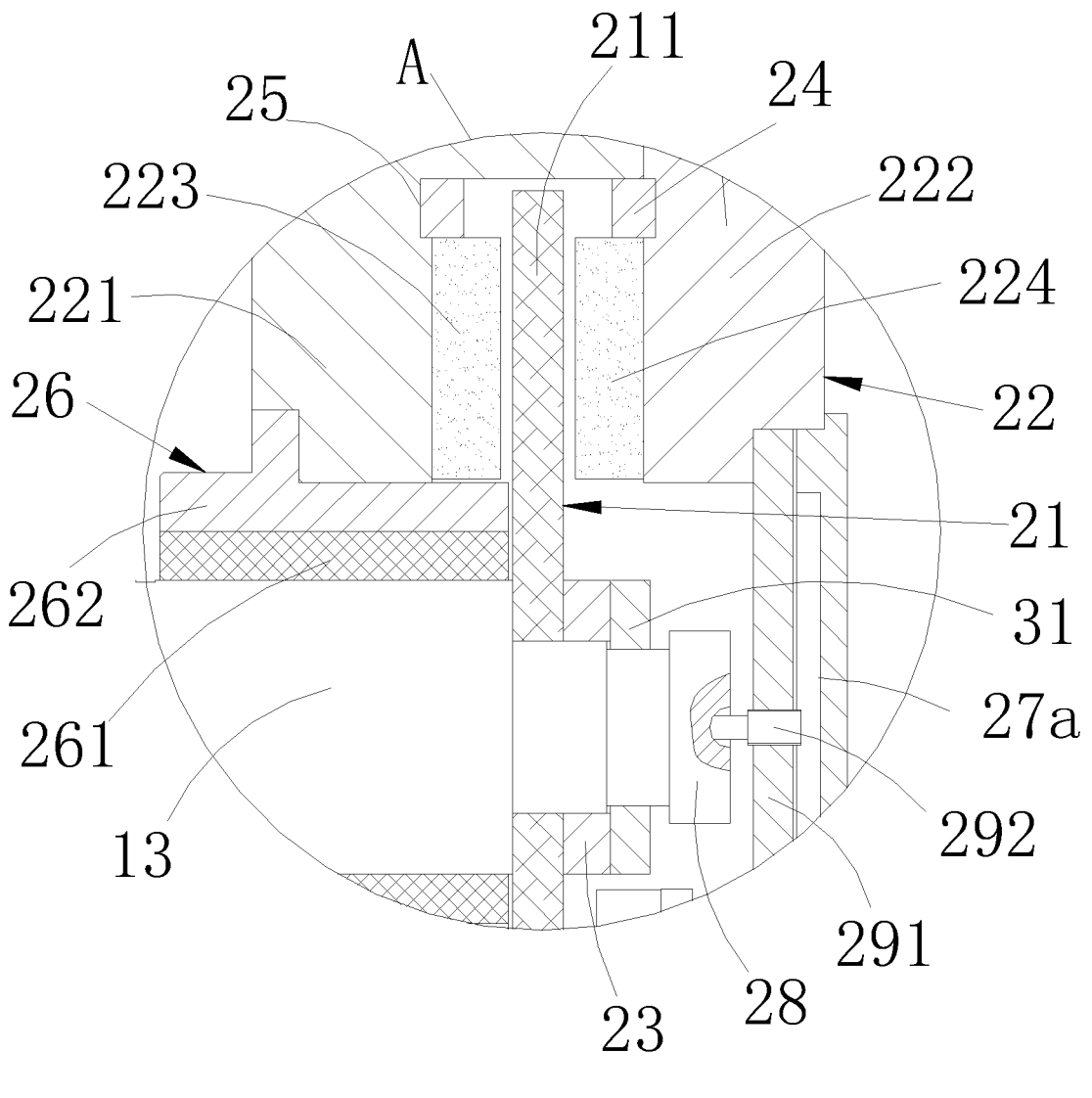
FIG. 3 is an enlarged view of A in FIG. 2.

Specifically, referring to FIG. 2 and FIG. 3, the first driving component 20 includes a first moving coil assembly 21 associated with the main shaft 13 and a first magnetic circuit assembly 22 matched with the first moving coil assembly 21. When working, an alternating current is switched on to the first moving coil assembly 21, and under the action of the air gap magnetic field generated by the first magnetic circuit assembly 22, an alternating driving torque is generated on the first moving coil assembly 21, which is transmitted to the table surface 12 through the main shaft 13 to swing back and forth around a balance position to realize the angular vibration of the table surface 12, and the table surface 12 can output angular momentum.

With such a driving method, the uniform torque generated by the energized coil located in the uniform air gap magnetic field acts on the main shaft, and the angular vibration of the table surface is driven by the main shaft, avoiding the commuting torque ripples and the electromagnetic torque ripples to achieve the angular vibration with an ordinary motor; and the output motion waveform has a low degree of distortion.

Referring to FIG. 2 and FIG. 3, the first moving coil assembly 21 is of a whole disc structure, and the main shaft 13 is provided with a step matched with the first moving coil assembly 21 to quickly locate the first moving coil assembly 21 and limit the position of the first moving coil assembly 21 on the main shaft 13; meanwhile, the main shaft 13 is screwed with a compression ring 23, and the compression ring 23 is matched with the step to fix the first moving coil assembly 21.

Referring to FIG. 2 and FIG. 3, specifically, the first moving coil assembly 21 includes at least one first moving coil unit, the first moving coil unit includes a disk-shaped first substrate 211 and a plurality of first coil groups fixed on the surface of the first substrate 211, and the first substrate 211 is fixedly connected with the main shaft 13. Each first coil group of a single first moving coil unit is connected in parallel or in series. The first coil group includes effective wire groups located inside the air gap magnetic field and connecting wire groups located outside the air gap magnetic field. The connecting wire groups outside the air gap magnetic field are concentric with the first substrate, and the effective wire groups inside the air gap magnetic field point to the center of circle of the first substrate. For the first moving coil unit used in this patent, reference is made to the Chinese patent 201310451020.6.

Specifically, referring to FIG. 2 and FIG. 3, the first magnetic circuit assembly 22 includes an inner magnetic base 221, an outer magnetic base 222, an inner magnetic steel 223, an outer magnetic steel 224 and a first air gap formed between the inner magnetic steel 223 and the outer magnetic steel 224.

The inner magnetic base 221 is mounted on the base 11; the outer magnetic base 222 is mounted on the base 11 and is located on the side of the inner magnetic base 221 away from the table surface 12, and the base 11 is also provided with a gland 15 that simultaneously compresses the inner and outer magnetic bases to fix the inner and outer magnetic bases; the inner and outer magnetic bases of the two groups of first magnetic circuit assembly 22 are matched with the base 11 to form a U-shaped structure; both ends of the main shaft 13 are respectively erected on the U-shaped structure to keep the axis level; specifically, both ends of the main shaft 13 are mounted on the inner magnetic base 221 by means of radial air bearings 26.

A plurality of the inner magnetic steels 223 are arranged along the circumferential direction of the axis of the main shaft, which are respectively fixed on the side wall of one side of the inner magnetic base 221 away from the table surface 12; a plurality of outer magnetic steels 224 are arranged along the circumferential direction of the axis of the main shaft, which are respectively fixed on the side wall of one side of the outer magnetic base 222 close to the table surface 12; the number of the inner magnetic steels 223 is equal to the number of the outer magnetic steels, and the inner magnetic steel 223 and the outer magnetic steel 224 are in one-to-one correspondence; the outer magnetic base 222, the inner magnetic base 221, the inner magnetic steel 223, the outer magnetic steel 224 and the first air gap form a closed magnetic circuit system; the effective wire groups in each first coil group in the first moving coil assembly 21 are always located in the air gap magnetic field formed between the corresponding inner magnetic steel 223 and the outer magnetic steel 224, and the first moving coil assembly 21 is in clearance fit with the inner magnetic steel 223 and the outer magnetic steel 224 respectively.

The inner magnetic steel 223 and the outer magnetic steel 224 are of the same structure, a plurality of the inner magnetic steels 223 form a circular area, and the outer magnetic steels 224 also form a circular area, and the circular area formed by the inner magnetic steels 223 is coaxial with the circular area formed by the outer magnetic steels 224, and the main shaft 13 extends into the circular areas.

The inner magnetic steel 223 and the outer magnetic steel 224 are respectively arranged in a tile shape; in the circumferential direction, there are gaps between adjacent magnetic steels. When the numbers of the outer magnetic steels 224 and the inner magnetic steels 223 change, the number of the coil groups on the first substrate 211 also changes. The numbers of both the inner magnetic steels 223 and outer magnetic steels 224 are a multiple of 2.

A permanent magnet magnetic circuit structure is adopted, the excitation coil is omitted, the loss of the excitation system is reduced, and the energy conversion efficiency is improved. The magnetic circuit structure is simple, compact and reliable in operation.

Referring to FIG. 2 and FIG. 3, locating rings 24 are arranged on the outer circumferences of the inner magnetic steel 223 and the outer magnetic steel 224 respectively. The locating ring 24 matched with the inner magnetic steel 223 is connected with the inner magnetic base 221 by means of fasteners, and the locating ring 24 matched with the outer magnetic steel 224 is connected with the outer magnetic base 222 by means of fasteners; the inner wall of the locating ring 24 is connected to the contours of the inner magnetic steel 223 and the outer magnetic steel 224 to limit the magnetic steels, avoiding the radial displacement of the magnetic steel along the main shaft 13 and ensuring the stability of the air gap magnetic field. Locating slots 25 that are matched with the locating rings 24 are formed in the inner magnetic base 221 and the outer magnetic base 222 respectively, and the locating rings 24 are partially clamped into the locating slots 25, to limit the position of the locating ring 24.

Referring to FIG. 2 and FIG. 3, the horizontal axial angular vibration device 10 further includes: a radial air bearing 26; the radial air bearing 26 is located between the main shaft 13 and the inner magnetic base 221.

Specifically, the radial air bearing 26 includes an air-bearing sleeve 261 sleeved on the main shaft 13 and a bearing housing 262 matched with the air-bearing sleeve 261, and the bearing housing 262 is mounted on the inner magnetic base 221; the air-bearing sleeve 261 and the bearing housing 262 belong to the prior art, and their structures will not be described repeatedly. A radial air film is formed between the air-bearing sleeve 261 and the side wall of the main shaft 13, and the radial air film supports the main shaft 13. Due to the extremely small viscosity of the gas, it can be considered as little or no friction, and the main shaft realizes full air bearing motion, thereby greatly reducing the influence of nonlinear frictional resistance on the rotation of the main shaft and reducing the degree of distortion of the motion waveform output by the angular vibration device 10. In addition, the gas overflowing from the air film of the radial air bearing can also play the role of cooling the first moving coil assembly.

Referring to FIG. 2 and FIG. 3, the angular vibration device 10 of the present application also includes an axial air bearing, which is composed of a plane air bearing 28, a support plate 291 and a compression bolt 292; two ends of the main shaft 13 are respectively provided with the plane air bearing 28, the support plate 291 is fixedly connected to the outer magnetic base 222, and the compression bolt 292 is screwed to the support plate 291 for compressing the plane air bearing 28 and the end portion of the main shaft 13. Specifically, the compression bolt 292 adopts a ball head compression bolt to eliminate the influence of the non-coaxiality of the compression bolt 292 and the main shaft 13, so that the plane air bearing 28 is always in contact with the end face of the main shaft 13 to maintain a plane and uniform air film. The plane air bearing 28 is a prior art, and the structure thereof is not described any longer.

In this way, an axial air film is formed between the plane air bearing and the end portion of the main shaft, which reduces the axial movement of the main shaft, provides the stability of the main shaft movement, and further reduces the degree of distortion of the motion waveform output by the angular vibration device 10.

Figure 4:
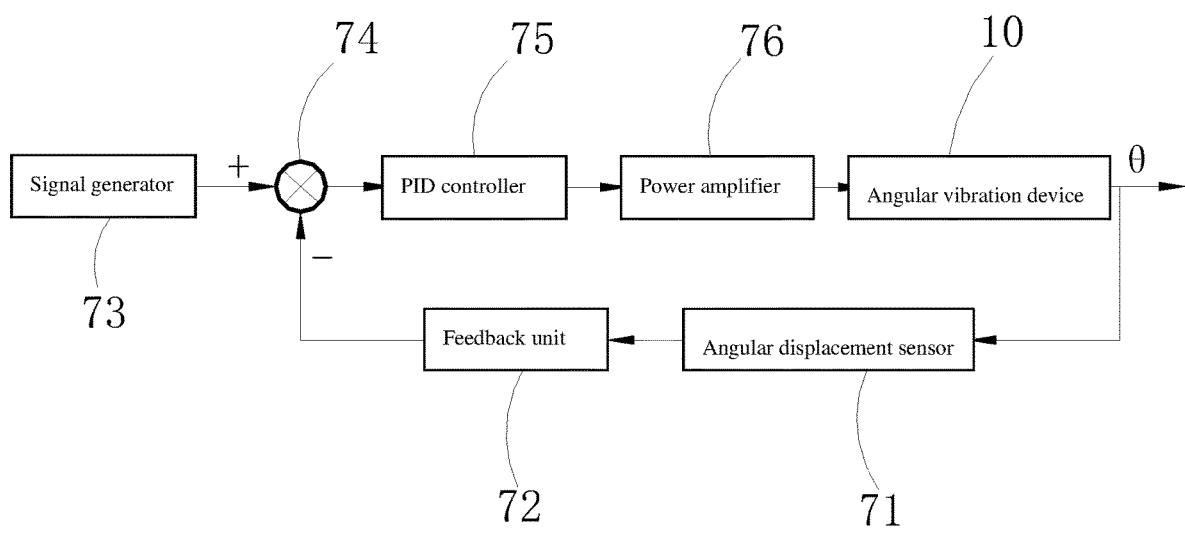
FIG. 4 is a schematic diagram of a feedback control component in Example 1 of the present invention.

Referring to FIG. 2 and FIG. 4, the feedback control of the angular vibration device 10 of the present invention is realized by means of a feedback control assembly 70.

Specifically, the feedback control assembly 70 includes an angular displacement sensor 71, a feedback unit 72, a signal generator 73, a subtractor 74, a PID controller 75, and a power amplifier 76; the angular displacement sensor is composed of a circular grating 31 and a reading head 61; the circular grating 31 is mounted on the compression ring 23 at one end of the main shaft 13 by means of fasteners, and the reading head 61 is mounted on the outer magnetic base 222 on the side corresponding to the circular grating 31 by means of a reading head mounting block 62. The circular grating 31 and reading head 61 are existing products, and the structures thereof are not described any longer. The reading head 61 is matched with the circular grating 31 to detect the angular displacement signal θ that the main shaft 13 and the table surface 12 rotate; the angular displacement signal is input into a feedback unit, the feedback unit amplifies the input signal to obtain a first output signal, and first differentiates the input signal and then amplifies it to obtain a second output signal (i.e., the feedback unit performs two types of processing on the input signal, to obtain the first output signal and the second output signal respectively), then superimpose the first output signal and the second output signal to obtain the output signal of the feedback unit; the output signal of the feedback unit and the standard signal output by the signal generator are subtracted by a subtractor to obtain the deviation signal, and then the deviation signal is processed by the PID regulator and output to the power amplifier to drive the main shaft 13 and the table surface 12 to move, thereby realizing the feedback control of the angular vibration device 10, which can improve and reduce the degree of distortion of the output motion waveform of the angular vibration device.

Referring to FIG. 2 and FIG. 3, in order to compensate for the centroid offset caused by the addition of a circular grating 31 at one end of the main shaft 13, a counterweight ring 32 is provided at the other end of the main shaft 13 away from the circular grating 31, and the mass of the counterweight ring 32 is the same as that of the circular grating 31, and the counterweight ring 32 and the circular grating 31 are arranged symmetrically with respect to the main shaft 13 to improve the rotation accuracy of the main shaft 13; specifically, the counterweight ring 32 is mounted on the compression ring 23 by means of fasteners.

Referring to FIG. 2 and FIG. 3, the outer magnetic base 222 is provided with a first through hole 2221, and the first through hole 2221 is used as a viewing window to facilitate the maintenance of the circular grating 31 and the reading head 61; the side of the outer magnetic base 222 away from the inner magnetic base 221 is provided with an end cap 27a for blocking the first through hole 2221, and the end cap 27a is screwed to the outer magnetic base 222 or connected by a fastener.

Example 2

Figure 5:
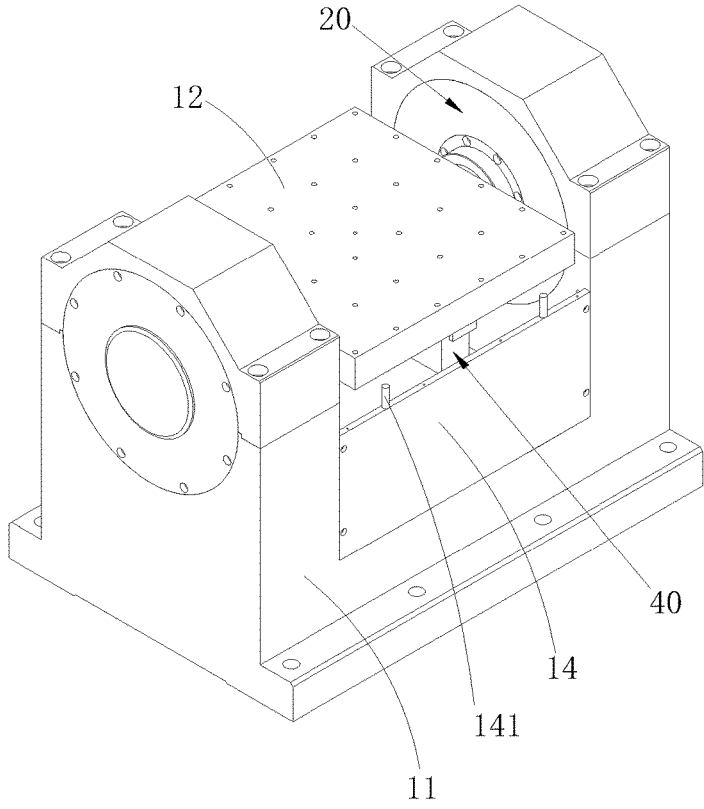
FIG. 5 is a perspective view of Example 2 of the present invention.
Figure 6:
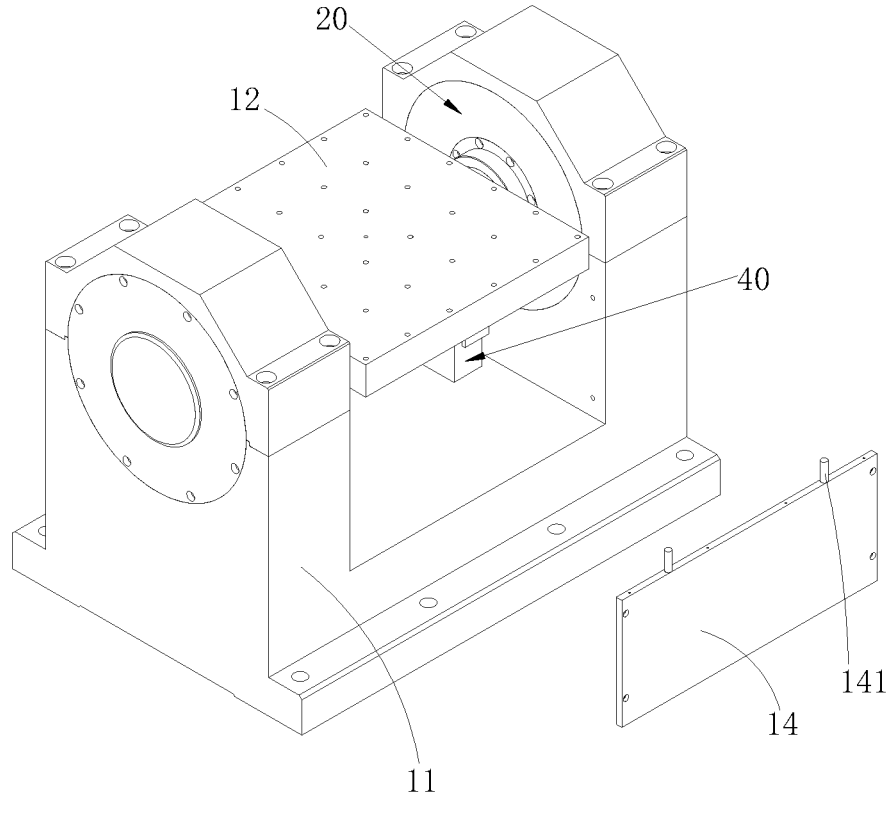
FIG. 6 is an exploded view of FIG. 5.
Figure 7:
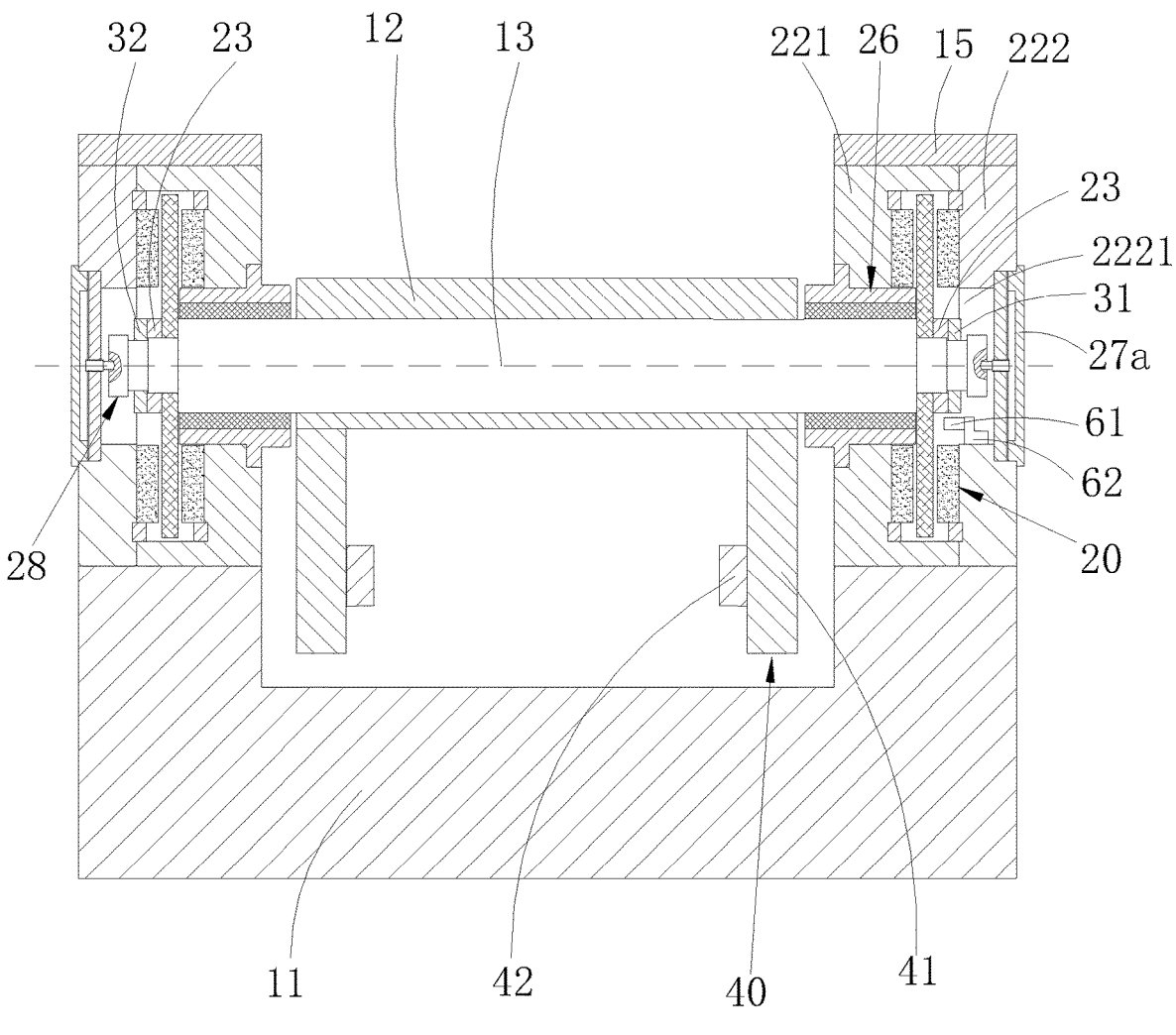
FIG. 7 is a cross-sectional view of Example 2 of the present invention.

Referring to FIG. 5 to FIG. 7, the difference between this example and Example 1 is that a centroid adjustment assembly 40 is provided on the table surface 12 or the main shaft 13 in this embodiment, to meet the requirements of the large load of the angular vibration device. When the angular vibration device 10 is in no-load on the table surface 12, the centroid of the moving component is adjusted on the axis of the main shaft 13, so that on the one hand, the moving component can have a smaller moment of inertia, and on the other hand, the table surface 12 can be guaranteed to be in the horizontal direction at still. When a test equipment with a larger mass is disposed on the table surface 12, the centroid of the entire moving component will move up, even reach above the table surface 12. By this way, not only the moment of inertia of the moving component will increase, but also the table surface will lose stability and fall to one side, increasing the difficulty to control the angular vibration device. To this end, by setting the centroid adjustment assembly 40 below the table surface, the deviation of the centroid is compensated, and the overall centroid of the moving component is adjusted to the axis of the main shaft 13, so that the moving component can continue to maintain a small moment of inertia. In addition, the table surface 12 can be guaranteed to be in the horizontal direction at still, the difficulty of controlling the angular vibration device can be reduced, and the degree of distortion of the motion waveform output by the table surface 12 is further reduced.

Referring to FIG. 5 to FIG. 8, the centroid adjustment assembly 40 includes a fixed balance block 41 detachably mounted on the table surface 12 and a plurality of adjustable balance blocks 42 mounted on the fixed balance block 41, the fixed balance block is disposed to be a T-shaped structure; the fixed balance block 41 is arranged in a reverse position where the centroid of the moving component deviates, thereby adjusting the uneven distribution of the overall centroid of the moving component; in this embodiment, the fixed balance block is arranged on one side of the table surface 12 close to the base 11, and the fixed balance block 41 has a flange surface 411 connected with the table surface 12. The adjustable balance block is disposed to be a U-shaped block, and at least part of the structure of the fixed balance block 41 is snapped into the adjustable balance block 42, so that the adjustable balance block 42 can only slide along the length direction of the fixed balance block 41, and the fixed balance block 41 is used as a platform for the adjustable balance block 42 to move; the adjustable balance block 42 and the fixed balance block 41 are fixed by multiple fastening bolts 43 and nuts 44.

By setting the adjustable balance block on the fixed balance block, the moving component can be adjusted to the axis of the main shaft by adjusting the adjustable balance block when the moving component is in a no-load condition; and when the table surface is equipped with a load which causes the centroid to shift, the position of the adjustable balance block can be adjusted to slightly adjust the centroid offset value, so that the centroid of the moving component returns to the axis of the main shaft, further improving the adjustment accuracy of uneven distribution of the centroid of the moving component, with great flexibility. Wherein, the number and the position of the adjustable balance block 42 can be adjusted according to actual working conditions.

Figure 8:
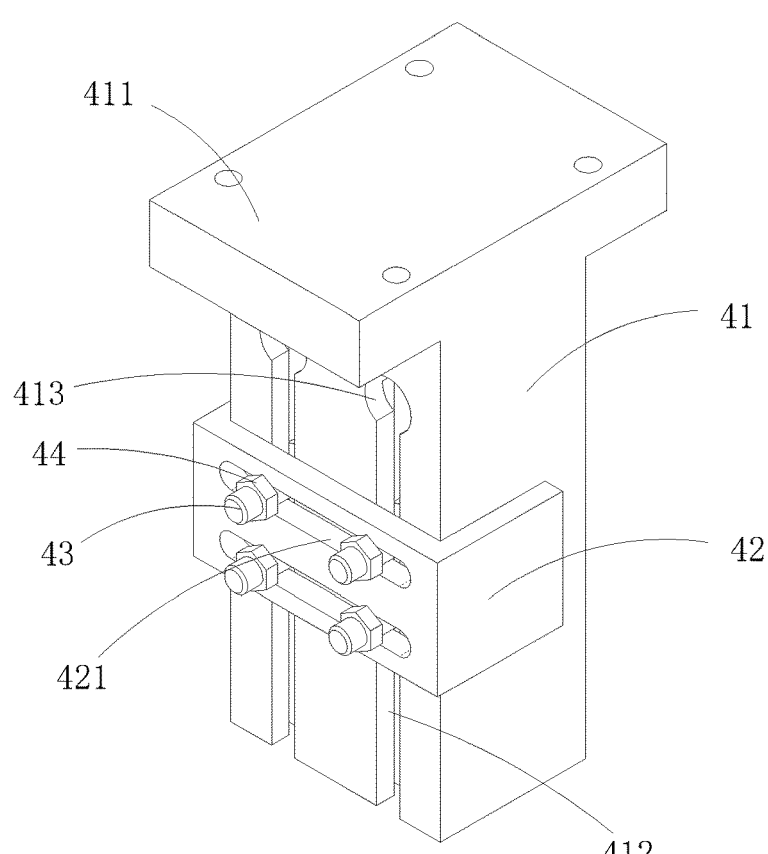
FIG. 8 is a perspective view of a centroid adjustment assembly in FIG. 6.
Figure 9:
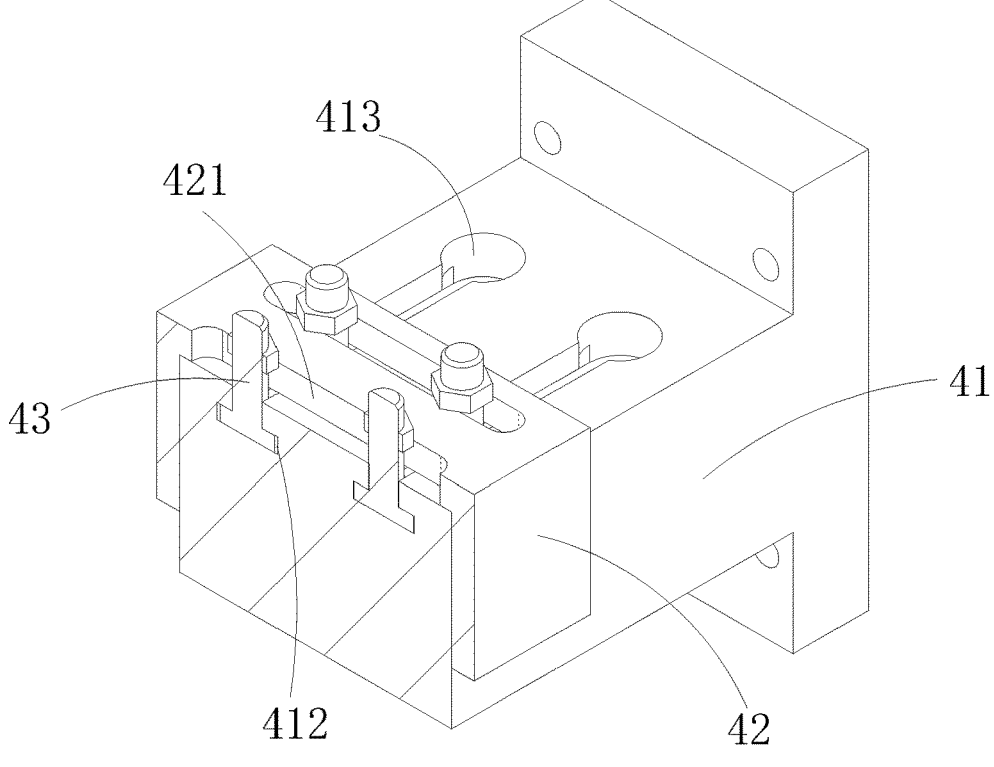
FIG. 9 is a cutaway perspective view of FIG. 8.
Figure 10:
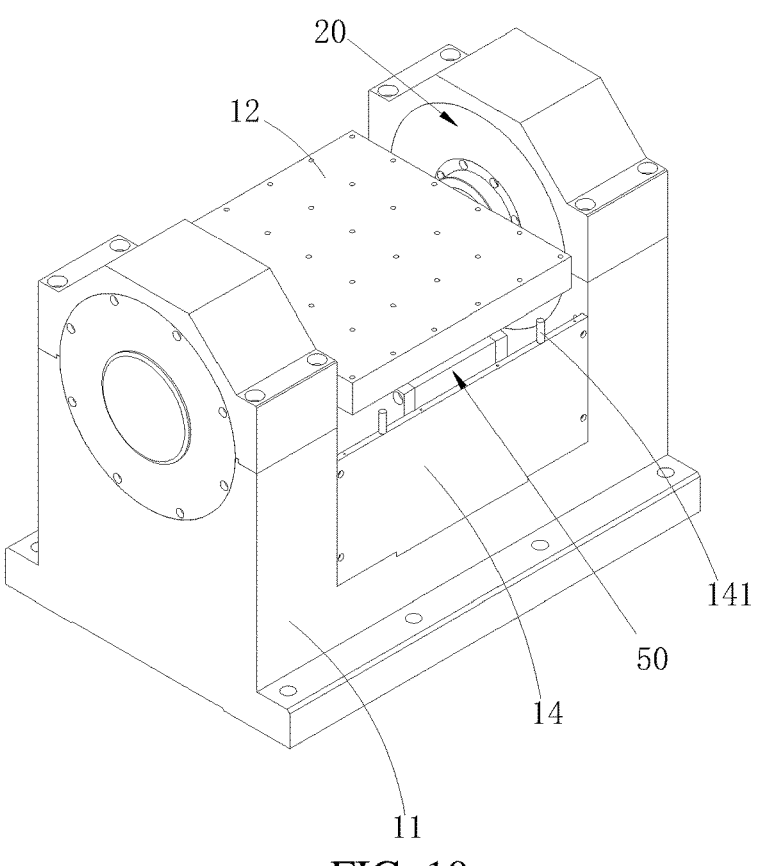
FIG. 10 is a perspective view of Example 3 of the present invention.
Figure 11:
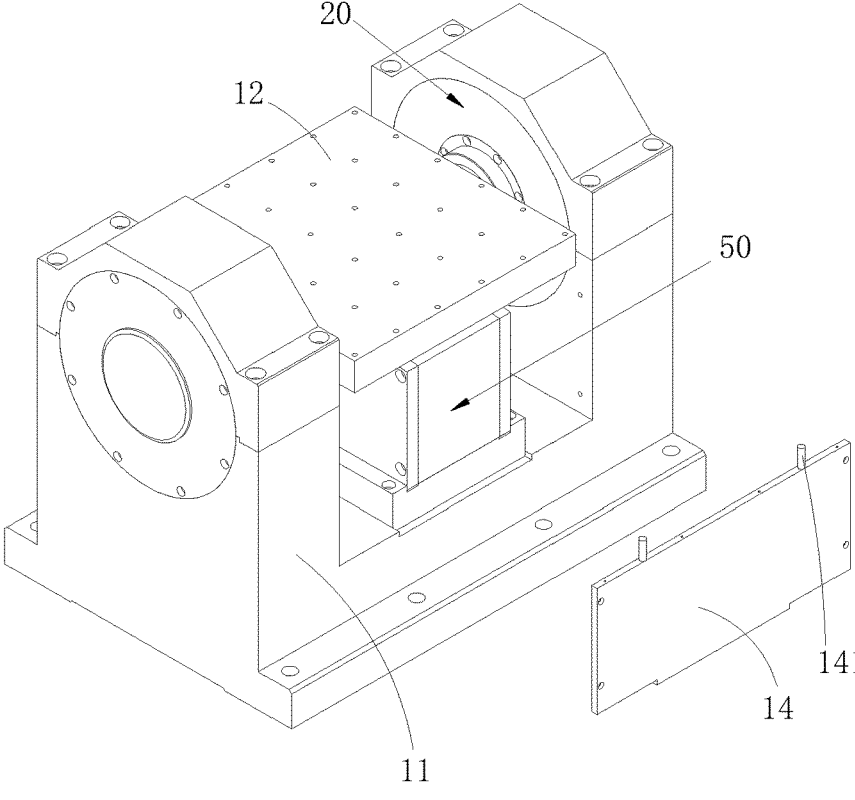
FIG. 11 is an exploded view of FIG. 10.

Referring to FIG. 8 and FIG. 9, one side of the fixed balance block 41 is provided with at least one guide groove 412 away from the table surface, and the guide groove 412 is disposed to be a T-shaped groove; the large-diameter end of the fastening bolts 43 is located in the guide groove 412, and the threaded section of the fastening bolt 43 penetrates through the adjustable balance block 42 and connects with the nut 44, and the position of the adjustable balance block 42 can be fixed by tightening the nut 44; the guide groove 412 is disposed to be a T-shaped groove, so that the large-diameter end of the fastening bolts 43 is always located in the T-shaped groove when adjusting the position of the adjustable balance block 42, facilitating the adjustment of the position of the adjustable balance block 42.

Referring to FIG. 8 and FIG. 9, the fixed balance block 41 is also provided with a penetration groove 413 communicating with the guide groove 412, the penetration groove 413 is located at the end of the guide groove 412 close to the flange face 411, and the penetration groove 413 can be penetrated by the large-diameter end of fastening bolts 43 to facilitate the assembly of the adjustable balance block 42. The adjustable balance block 42 is also provided with at least one transverse groove 421 through which the threaded section of the fastening bolts 43 can pass, and the transverse groove 421 is arranged perpendicular to the guide groove 412; in this embodiment, two guide grooves 412 are provided, and the two guide grooves 412 are arranged parallel to each other; two transverse grooves 421 are provided, and the two transverse grooves 421 are also arranged parallel to each other, straddling the two guide grooves 412, so that the four fastening bolts 43 located in the two guide grooves 412 can pass through the same transverse groove 421 in pairs, maintaining the vertical state of the transverse grooves 421 and the guide groove 412 and thereby avoiding the offset of adjustable balance block 42.

Referring to FIG. 5 to FIG. 7, in this embodiment, two groups of centroid adjustment assembly 40 are provided, and the two groups of centroid adjustment assembly 40 are arranged at intervals along the length direction of main shaft 13, and arranged symmetrically in the mid-section in the length direction of the main shaft 13 relative to the table surface 12. The side plates 14 symmetrically arranged on the base 11 can protect the centroid adjustment assembly 40. Of course, the number and specific mounting positions of the centroid adjustment assembly 40 can be configured according to actual working conditions.

Example 3

Referring to FIG. 10 to FIG. 13, the difference between this example and Example 1 is that in this embodiment, the base 11 is also provided with a second driving component 50 associated with the table surface 12 and/or the main shaft 13 partially penetrating the table surface. The second driving component 50 is connected to the base 11 by means of the mounting base 55, and the second driving component 50 is located between two groups of the first driving components 20; the side plates 14 symmetrically arranged on the base 11 can be used for protecting the second driving component 5. The second driving component 50 includes a second moving coil assembly 51 mounted on the table surface 12 or the main shaft and a second magnetic circuit assembly 52 matched with the second moving coil assembly 51; when the angular vibration device 10 is working and a test equipment with a large mass is mounted on the table surface 12, which produces a gravitational moment acting on the table surface 12 and the main shaft 13, a current is switched on to the second moving coil assembly, and under the action of the air gap magnetic field generated by the second magnetic circuit assembly, a torque equal to and opposite to the above gravitational moment is generated for compensation on the second moving coil assembly. A second driving component is provided, when the angular vibration device is working, the test equipment is disposed on the table surface so that the overall centroid of the moving component moves up above the rotating main shaft; when the moving component is turned over in entirety due to the gravitational moment, a torque equal to and opposite to the above gravitational moment is generated for compensation on the second driving component, so that the moving component returns to the equilibrium position and the table surface is leveled to the zero position.

Figure 12:
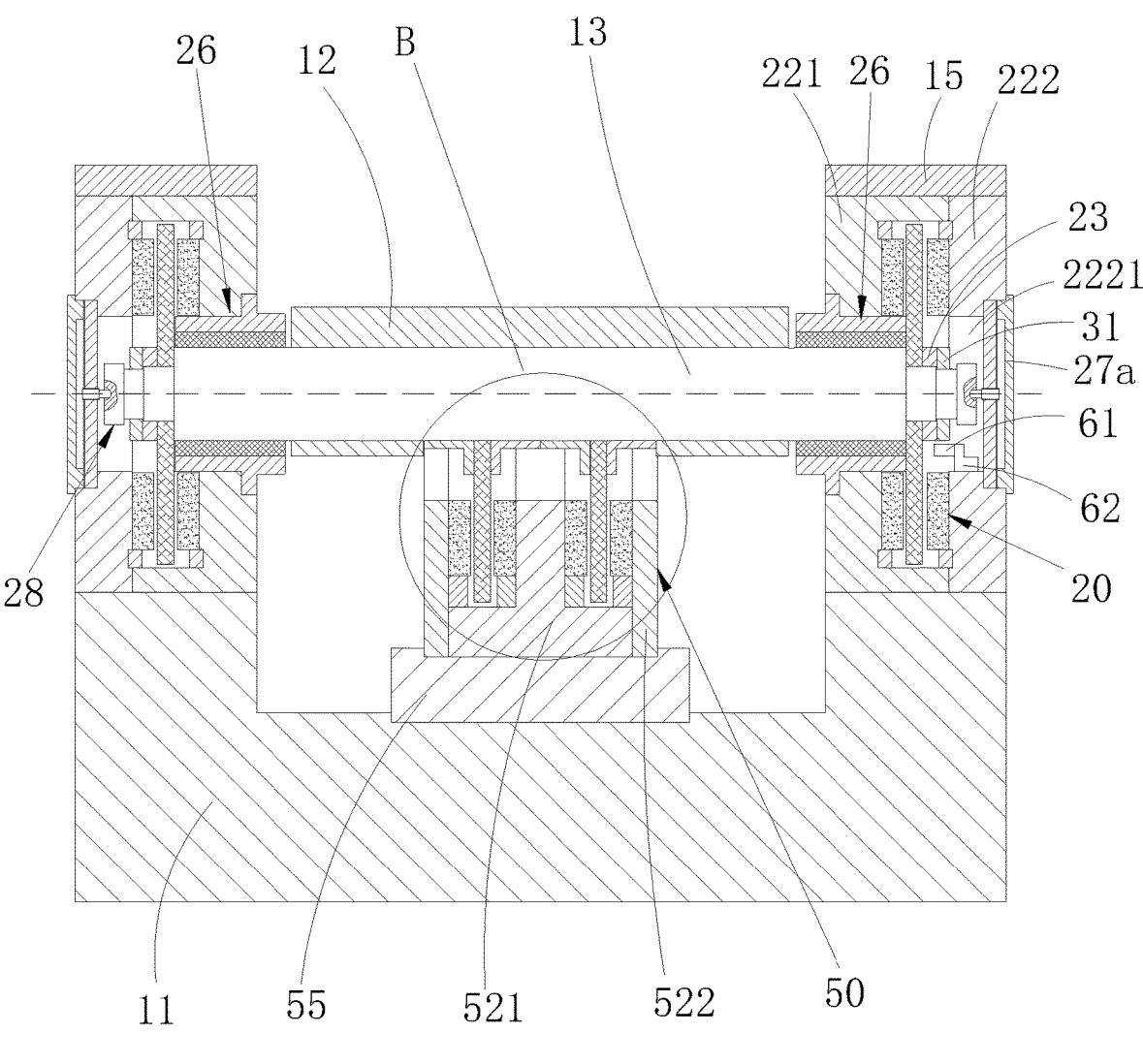
FIG. 12 is a cross-sectional view of Example 3 of the present invention.
Figure 13:
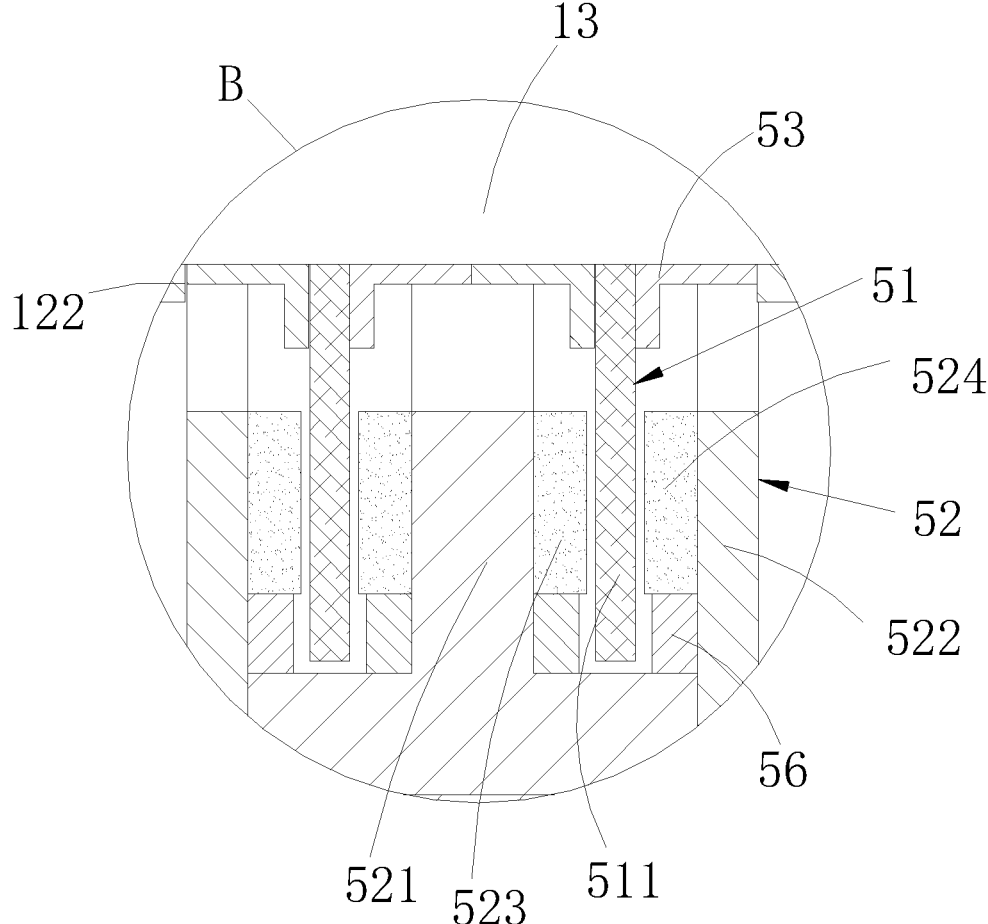
FIG. 13 is an enlarged view of B in FIG. 12.

Specifically, referring to FIG. 12 and FIG. 13, the second magnetic circuit assembly 52 includes a first magnetizer 521, a second magnetizer 522, a first magnetic steel 523, a second magnetic steel 524 and a second air gap formed between the first magnetic steel 523 and the second magnetic steel 524.

The first magnetizer 521 and the second magnetizer 522 are fixed on the mounting base 55 respectively; a plurality of the first magnetic steels 523 are provided and fixed on the first magnetizer 521 respectively; a plurality of the second magnetic steels 524 are provided and fixed on the side wall of one side of the second magnetizer 522 close to the first magnetizer 521; the first magnetizer 521, the second magnetizer 522, the first magnetic steel 523, the second magnetic steel 524 and the second air gap form a closed magnetic circuit system; the positions of the first magnetic steel 523 and the second magnetic steel 524 are in one-to-one correspondence, and the second moving coil assembly 51 is in clearance fit with the first magnetic steel 523 and the second magnetic steel 524 respectively.

Figure 15:
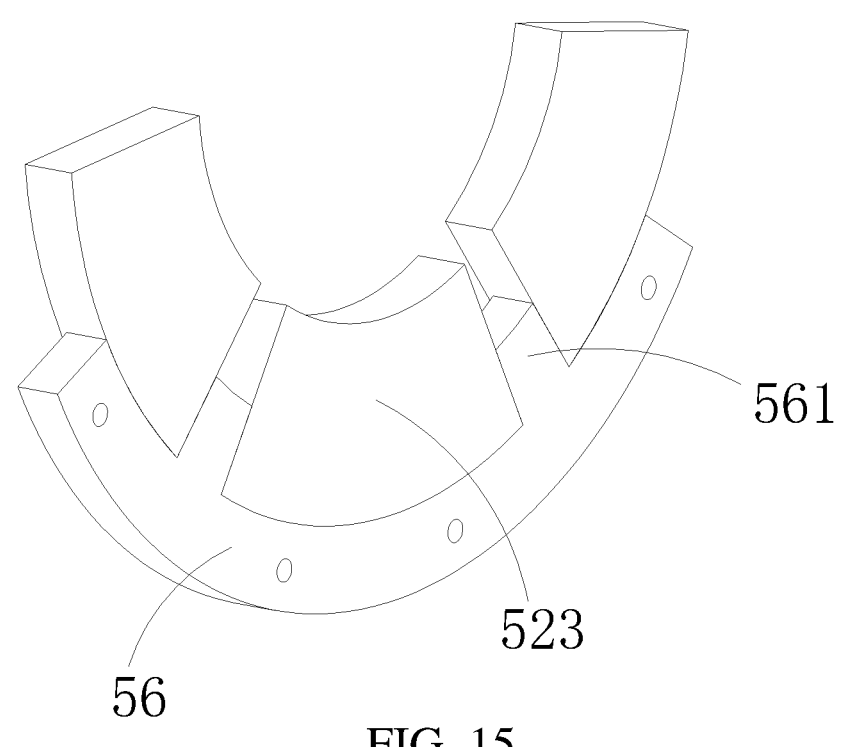
FIG. 15 is a perspective view illustrating the matching between a magnetic steel and a locating piece in FIG. 12.

Referring to FIG. 12, FIG. 13 and FIG. 15, the first magnetic steel 523 and the second magnetic steel 524 are of the same structure, a plurality of the first magnetic steels 523 form a fan-shaped area, and a plurality of the second magnetic steels 524 also forms a fan-shaped area. The fan-shaped area formed by a plurality of the first magnetic steels 523 and the fan-shaped area formed by a plurality of the second magnetic steels 524 are arranged coaxially with the main shaft 13. The first magnetic steel 523 and the second magnetic steel 524 are respectively arranged in a tile shape, and there are gaps between adjacent magnetic steels in the circumferential direction.

Referring to FIG. 13 and FIG. 15, the first magnetic steel 523 and the second magnetic steel 524 are respectively provided with a locating piece 56 on the outer periphery, and the locating piece 56 matched with the first magnetic steel 523 is connected with the first magnetizer 521 by means of a fastener, the locating piece 56 matched with the second magnetic steel 524 is connected with the second magnetizer 522 by means of a fastener; the locating piece 56 is configured as a partial ring, and the locating piece 56 is integrally formed with a clamping block 561 that can be inserted into the gap between adjacent magnetic steels, which is used to limit the first magnetic steel 523 or the second magnetic steel 524 to avoid displacement and ensure the stability of the air gap magnetic field.

Figure 14:
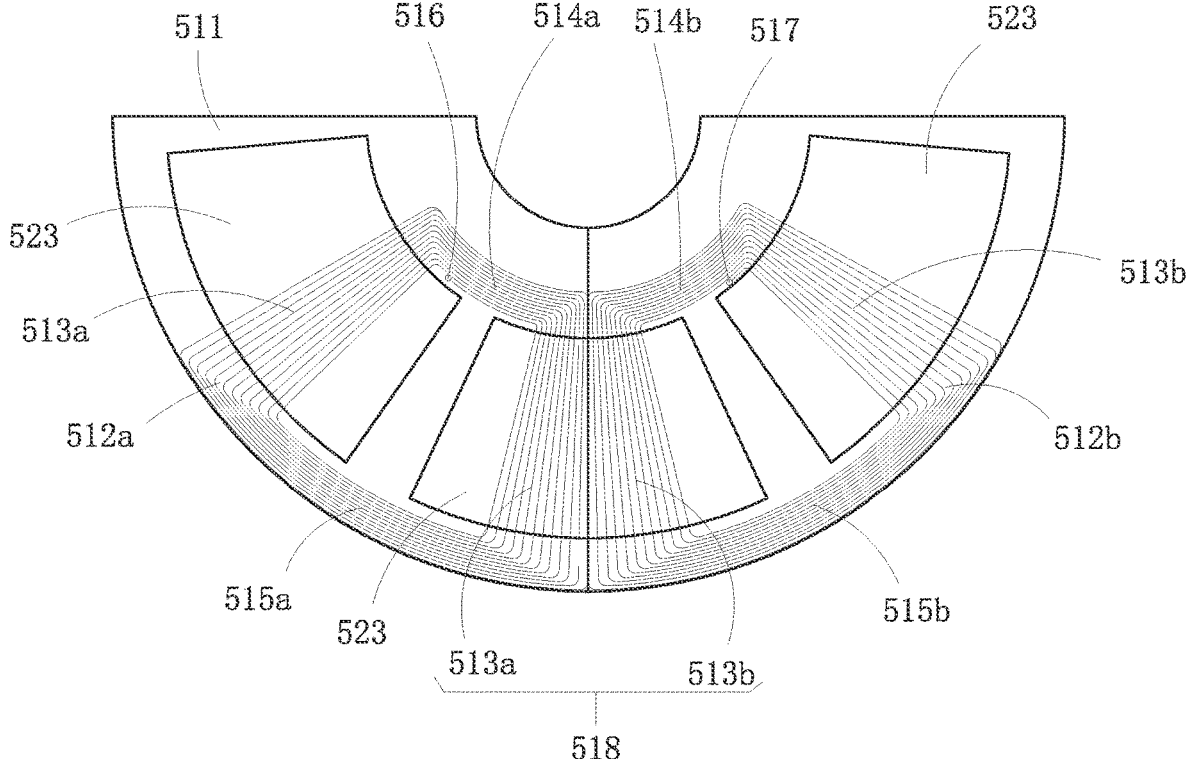
FIG. 14 is the winding layout of the second coil group in FIG. 12.

Referring to FIG. 12 to FIG. 14, the second moving coil assembly 51 is configured as a semi-disc structure, the second moving coil assembly 51 includes at least one second moving coil unit, and the second moving coil unit includes a semi-circular second substrate 511 and at least one second coil group fixed on the surface of the second substrate 511; in this embodiment, a second coil group is provided on the second substrate, and the second coil group includes a first coil 512a and a second coil 512b wound by a wire.

Referring to FIG. 14, the first coil 512a is formed by winding a wire gradually from small to large from the inside to the outside, and the second coil 512b is formed by gradually winding a wire from large to small from the outside to the inside, and all the wires are on the surface of the second substrate 511. The second coil group starts from the inner starting end 516 of the first coil 512a and ends at the inner tail end 517 of the second coil 512b.

The first coil 512a includes effective wire groups 513a located inside the air gap magnetic field, a first connecting wire group 514a and a second connecting wire group 515a located outside the air gap magnetic field. The first coil 512a comprises two effective wire groups 513a, and all wires in the effective wire groups 513a point to the center of circle of the second substrate 511.

The first connecting wire group 514a, the second connecting wire group 515a and the second substrate 511 are arranged concentrically. The first connecting wire group 514a and the second connecting wire group 515a are respectively located between the two effective wire groups 513a, and the first connecting wire group 514a is relatively close to the center of circle of the second substrate, and the second connecting wire group 515a is relatively far away from the center of circle of the second substrate.

The second coil 512b and the first coil 512a are of the same structure, including effective wire groups 513b located inside the air gap magnetic field and the first connecting wire group 514b and the second connecting wire group 515b located outside the air gap magnetic field.

The second coil 512b comprises two effective wire groups 513b, and all wires in the effective wire groups 513b point to the center of circle of the second substrate 511.

The first connecting wire group 514b, the second connecting wire group 515b and the second substrate 511 are arranged concentrically. The first connecting wire group 514b and the second connecting wire group 515b are respectively located between the two effective wire groups 513b, and the first connecting wire group 514b is relatively close to the center of circle of the second substrate, and the second connecting wire group 515b is relatively far away from the center of circle of the second substrate.

By adopting such a technical solution, and setting a coil on the semi-disc type second substrate, the volume of the moving coil is reduced, the weight is lightened, and the rigidity is increased, the moment of inertia of the moving coil is reduced, and the inherent frequency of the moving coil is increased.

FIG. 14 shows the positional relationship between the first coil 512a, the second coil 512b and the first magnetic steel 523.

Referring to FIG. 14, the two effective wire groups in each coil are corresponding to different first magnetic steels 523 respectively, and the magnetic field directions in the second air gap corresponding to the two adjacent first magnetic steel 523 are opposite in the circumferential direction. When a current is switched on to the coil, the current direction of the two effective wire groups in a coil is opposite, so the Ampere force that the two effective wire groups are subjected to is in the same direction, thereby generating a torque in the same direction.

One effective wire group 513a of the first coil 512a and one effective wire group 513b of the adjacent second coil 512b form an Ampere force generating portion 518, which makes the structure of the coil group to be more compact; the direction of the air gap magnetic field that is subjected to by the Ampere force generating portion 518 is the same, and the current direction of the effective wire group 513a and the effective wire group 513b in the Ampere force generating portion 518 is the same, consequently, the Ampere force generating portion 518 is subjected to the ampere force in a single direction and then a torque is produced in the same direction.

Certainly, in other embodiments, a plurality of second coil groups are provided on one second substrate 511, and the second coil groups are connected in series or in parallel.

When there is a plurality of the second moving coil units, the plurality of second moving coil units are connected in series or in parallel.

Connection in series means that among two adjacent second moving coil units, the coil starting point of one second moving coil unit is connected to the coil end point of the other second moving coil unit.

Connection in parallel means that among two adjacent second moving coil units, the coil starting point of one second moving coil unit is connected to the coil starting point of the other second moving coil unit, and the coil end point of one second moving coil unit is connected to the coil end point of the other second moving coil unit.

For the method of manufacturing the second moving coil assembly 51, reference is made to the Chinese patent CN 201310451020.6.

Referring to FIG. 12 and FIG. 13, a notch 122 is formed on the side of the table surface 12 facing to the base 11, so that the position of the main shaft 13 corresponding to the notch 122 is partially exposed; the second moving coil assembly 51 is partially located in the notch 122, and the second moving coil assembly 51 is provided with a groove that can cover part of the circumference of the main shaft 13, and the inner wall of the groove is fit to the side wall of the main shaft 13, so that the second moving coil assembly 51 can generate a torque relative to the axis of the main shaft 13.

Figure 16:
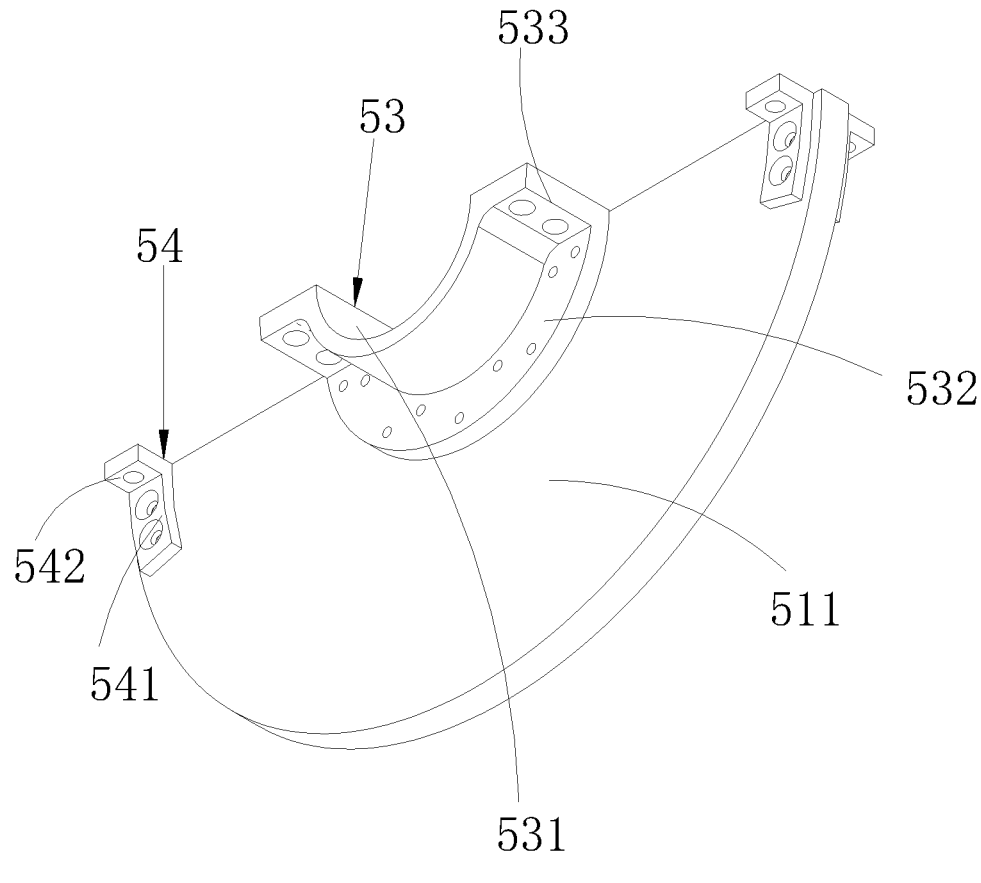
FIG. 16 is a perspective view illustrating the matching between the first and second fixed blocks and the second moving coil assembly in FIG. 12.

Referring to FIG. 12 and FIG. 16, the second substrate 511 is fixedly connected to the table surface 12 by means of a connecting structure. The connecting structure includes a first fixed block 53 and a second fixed block 54; two first fixed blocks 53 are provided and arranged symmetrically on both sides of the second substrate 511, to limit the position of the second substrate 511; the first fixed block 53 is configured to be a tile shape, and a camber surface 531 covering the main shaft 13 is provided on the side facing to the table surface 12, which locates the first fixed block 53 so that the centerline of the first fixed block 53 coincides with the axis of the main shaft 13; one end of the first fixed block 53 abuts against the second substrate 511, and the first fixed block 53 is provided with a first connecting portion 532 connected with the second substrate 511 and a second connecting portion 533 connected with the table surface 12; the first connecting portion 532 is configured as a partial ring, located at the end of the first fixed block 53 toward the second substrate 511, the first connecting portion 532 is connected with the second substrate 511 by means of a fastener; the second connecting portion 533 is formed by extending the axis of the camber surface 531 in the radial direction. Two second connecting portions are provided and arranged symmetrically with respect to the mid-section of the first connecting portion 532, and the second connecting portion 533 is connected to the table surface 12 by means of a fastener.

Referring to FIG. 16, there are 4 second fixed blocks 54, wherein every two second fixed blocks 54 are configured as one group, and the two groups are respectively located at the positions away from the centerline of the second substrate 511, and the two second fixed blocks 54 are arranged symmetrically with respect to the second substrate 511; the second fixed block 54 is configured as L-shaped, and is provided with a first branch 541 connected to the second substrate 511 and a second branch 542 connected to the table surface 12, further improving the stability of the second substrate 511.

In this embodiment, referring to FIG. 12, two groups of the second driving components 50 are provided, and the two groups of second driving components 50 share a magnetizer 521. The cross section of the first magnetizer 521 is configured as an inverted T shape, and the second magnetizer 522 of the two groups of second driving components 50 are symmetrically arranged on both sides of the first magnetizer 521, so that the structure is compact and the production cost is reduced; certainly, the number of the second driving components 50 is not limited to the examples of this embodiment, and each group of the second driving components 50 can be spaced independently.

In this embodiment, the specific working principle of the second driving component 50 for torque compensation is as follows:

S1: When the test equipment is not disposed on the table surface and the table surface of the horizontal axial angular vibration device 10 is horizontal, it is recorded as a balance position, and the zero position of the circular grating is recorded.

S2: When the test equipment is disposed on the table surface, the centroid of the moving component moves up, causing the overall centroid of the moving component to shift the axis of the main shaft above the moving component, and a deflection moment is generated relative to the axis, causing overall instability of the moving component and offset from the zero position;

S3: The circular grating feeds back the overall deflection angle displacement signal of the moving component to the host computer.

S4: The host computer calculates the deflection moment according to the overall deflection angle displacement of the moving component, and outputs the corresponding current to the second moving coil assembly 51; the second driving component 50 generates a compensating moment equal to the deflection moment and opposite in direction to compensate the position of the moving component, making the table surface to return to the level and the zero position.

Example 4

Figure 17:
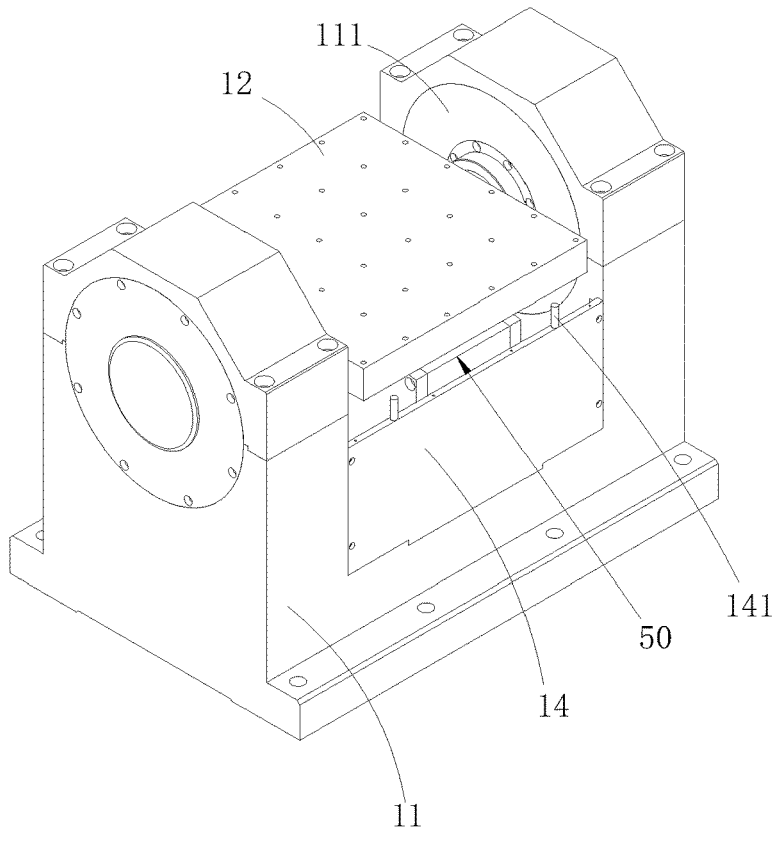
FIG. 17 is a perspective view of Example 4 of the present invention.
Figure 19:
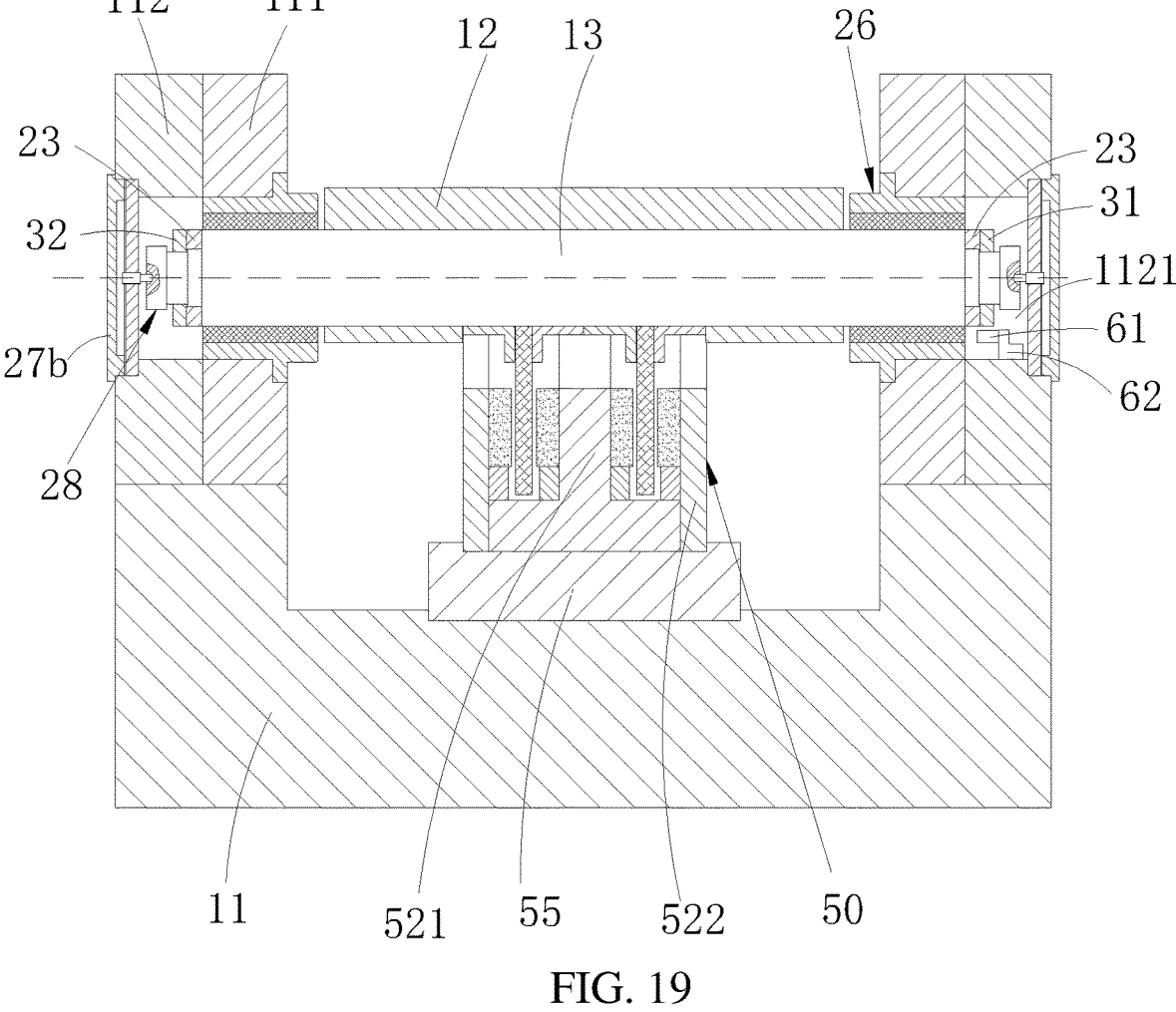
FIG. 19 is a sectional view of Example 4 of the present invention.

Referring to FIG. 17 and FIG. 19, the difference between this example and Example 3 is that no first driving component 20 is provided, and at least one group of the second driving components 50 associated with the main shaft 13 and/or the table surface 12 are arranged only on the base 11, which can directly drive the main shaft 13 to rotate back and forth by means of the second driving component 50 (at this time, the second driving component 50 is equivalent to the first driving component 20), so that the angular momentum is output on the table surface 12 to excite the test equipment. In this embodiment, the maximum angular displacement of the second moving coil assembly 51 is determined by the maximum angle at which the effective wire groups 513 can rotate in the same air gap magnetic field, and the maximum angular displacement of the second moving coil assembly 51 determines the maximum output amplitude of the table surface. According to the requirement of the output angular amplitude of different angular vibration devices 10 and based on the design concept of fully utilizing the space of the substrate to arrange the coils, moving coil structures with different number of coil groups can be designed.

Figure 18:
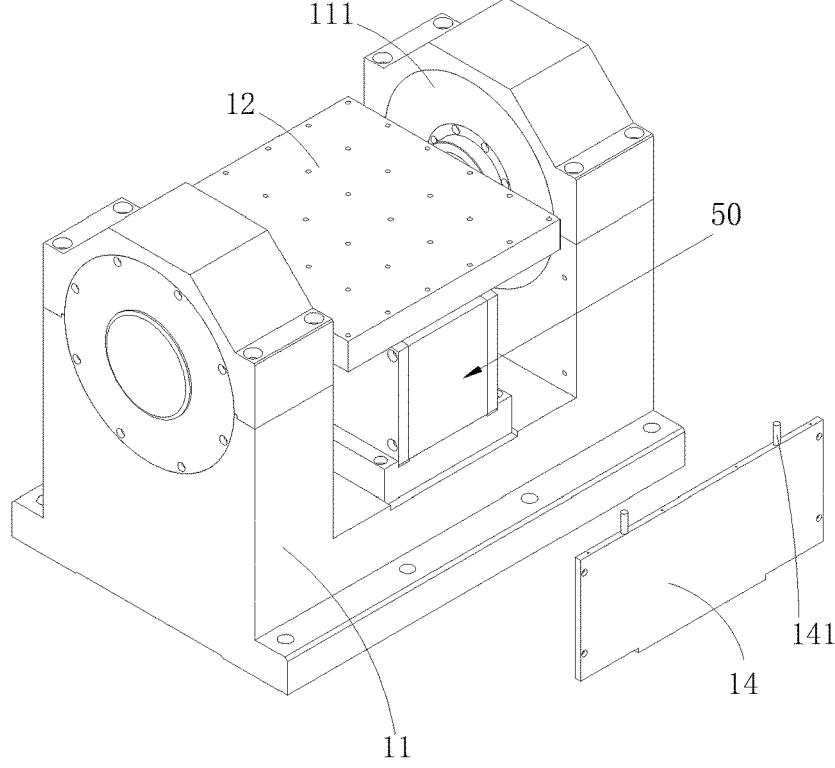
FIG. 18 is an exploded view of FIG. 17.

Referring to FIG. 17 to FIG. 19, two first supports 111 are symmetrically arranged on the base 11, and the two ends of the main shaft 13 are respectively supported on the first supports 111 by means of radial air bearings 26. The first support 111 is also provided with a second support 112 on the side away from the table surface, and the second support 112 is also fixed on the base 11, and the second support 112 is provided with a second through hole 1121, wherein the end portion of the main shaft 13 extends into the second through hole 1121; the second support 112 on the side away from the first support 111 is provided with an end cap 27b for blocking the second through hole 1121, and the end cap 27b is screwed to the second support 112 or connected by a fastener.

In this embodiment, referring to FIG. 19, two groups of the second driving components 50 are provided, and the two groups of the second driving components 50 share a magnetizer 521. The cross section of the first magnetizer 521 is configured as an inverted T shape, and the second magnetizer 522 of the two groups of second driving components 50 are symmetrically arranged on both sides of the first magnetizer 521, so that the structure is compact and the production cost is reduced; certainly, the number of the second driving components 50 is not limited to the examples of this embodiment, and each group of the second driving components 50 can be spaced independently.

Further, the angular vibration device 10 is provided with at least two groups of the second driving components 50, wherein an alternating current is switched on to at least one group of the second driving components, to drive the main shaft or the table surface to perform angular vibration, and the remaining second driving components are used for torque compensation; when the angular vibration device 10 is working, after the test equipment is mounted on the table surface 12, the centroid of the moving component will move up, and the overall centroid of the moving component will shift to the axis of the main shaft above the moving component, which generates a gravitational moment acting on the table surface 12 and the main shaft 13; the second driving component 50 that is used for torque compensation can generate a torque that is equal in size and opposite in direction for compensation. All the second driving components 50 can be configured individually or combined by sharing the first magnetizer 521.

The working principle of the second driving component in this embodiment is as follows:

St1: When the test equipment is not disposed on the table surface, according to the design requirements, the centroid of the moving component is just on the axis of the main shaft; at this time, the table surface can be kept in a horizontal position and set as the balance position of the moving component and the zero position for recording the circular grating;

St2: When the test equipment is disposed on the table surface, the centroid of the moving component will shift upwards. When the centroid of the moving component is above the axis of the main shaft, the gravity of the moving component will generate a gravitational moment for deflection, causing the overall rotation of the moving component to shift the zero position;

St3: The second driving component that is used as a power source drives the moving component to swing back and forth around a balance position, and the circular grating feeds back the overall deflection angle displacement signal of the moving component to the host computer;

St4: The host computer calculates the magnitude of the deflection gravitational moment according to the overall deflection angular displacement of the moving component, and outputs the corresponding current to the second moving coil assembly in the second driving component that is used for torque compensation, and the second driving component that is used for torque compensation generates a compensating moment that is equal to the deflection gravitational moment and opposite in direction for compensating the moving component, so that the table surface is horizontal to return to zero position.

The foregoing embodiments do not constitute a limitation to the scope of protection of the technical solutions. Any modifications, equivalent replacements and improvements made within the spirit and principles of the above embodiments shall fall within the scope of protection of the present invention.

What is claimed is:

1. A horizontal axial angular vibration device, comprising a base;

a moving component, comprising a table surface for disposing a test equipment and a main shaft connected to the table surface to drive the table surface to rotate; wherein:

further comprising:

a driving component, associated with the table surface and/or main shaft to drive the table surface to swing around the axis of the main shaft;

the axis of the main shaft is horizontally disposed;

wherein the driving component is a first driving component, and the first driving component comprises a first moving coil assembly associated with both ends of the main shaft and a first magnetic circuit assembly matched with the first moving coil assembly; the first moving coil assembly is mounted on the moving component, and the first magnetic circuit assembly is fixed to the base; and when alternating current is applied to the first moving coil assembly, under the action of an air gap magnetic field generated by the first magnetic circuit assembly, an alternating driving torque is generated on the first moving coil assembly, thereby driving the moving component to swing back and forth around a balance position, achieving angular vibration of the table surface;

wherein the first moving coil assembly is of a whole disc structure, comprising a first substrate and a first coil group fixed on the surface of the first substrate, and the first substrate is fixedly connected to the main shaft; the first magnetic circuit assembly comprises an inner magnetic base arranged on the base, an outer magnetic base arranged on the base and corresponding to the inner magnetic base, an inner magnetic steel arranged on the inner magnetic base, an outer magnetic steel arranged on the outer magnetic base, and a first air gap formed between the inner magnetic steel and the outer magnetic steel; and the first moving coil assembly is in clearance fit with the inner and outer magnetic steel respectively.

2. The horizontal axial angular vibration device according to claim 1, wherein two groups of the first driving components are provided, and the two groups of the first driving components are symmetrically arranged at both ends of the main shaft to simultaneously drive the main shaft to rotate.

3. The horizontal axial angular vibration device according to claim 1, wherein the inner magnetic steel and the outer magnetic steel are of the same structure, the inner magnetic steel and the outer magnetic steel enclose a circular area respectively, the circular area enclosed by the inner magnetic steel is coaxial with the circular area enclosed by the outer magnetic steel, and the main shaft extends into the circular areas; the number of the outer magnetic steels is equal to the number of the inner magnetic steels, and the positions of the inner magnetic steel and the outer magnetic steel are in one-to-one correspondence; and the numbers of both the outer magnetic steel and the inner magnetic steel are a multiple of 2.

4. The horizontal axial angular vibration device according to claim 3, wherein positioning rings are arranged on the outer circumferences of the inner magnetic steel and the outer magnetic steel respectively, and inner walls of the positioning rings are connected to contours of the inner magnetic steel and the outer magnetic steel; and positioning grooves that are matched with the positioning rings are formed in the inner magnetic base and the outer magnetic base respectively, and the positioning rings are partially clamped into the positioning grooves.

5. The horizontal axial angular vibration device according to claim 1, wherein the driving component is a second driving component, and the second driving component is arranged in the middle of the main shaft, and comprises a second moving coil assembly mounted on the table surface or main shaft and a second magnetic circuit assembly matched with the second moving coil assembly; the second moving coil assembly is mounted on the moving component, and the second magnetic circuit assembly is fixed to the base; and when current is applied to the second moving coil assembly, under the action of an air gap magnetic field generated by the second magnetic circuit assembly, a compensating torque is generated on the second moving coil assembly to compensate for a gravitational moment on the moving component, wherein the compensating torque acts on the moving component in addition to the alternating driving torque generated on the first moving coil assembly.

6. The horizontal axial angular vibration device according to claim 5, wherein the second moving coil assembly comprises at least one second moving coil unit, the second moving coil unit comprises a semi-circular second substrate and at least one second coil group fixed on the surface of the second substrate, and the center of the circle of the second substrate coincides with the axis of the main shaft.

7. The horizontal axial angular vibration device according to claim 6, wherein the second coil group comprises a first coil and a second coil formed by a wire in a winding manner; the first coil and the second coil respectively comprise effective wire groups located inside the air gap magnetic field, and a first connecting wire group and a second connecting wire group located outside the air gap magnetic field, each coil comprises two effective wire groups, and the first and second connecting wire group are respectively connected to the effective wire groups on both sides; the first connecting wire group is close to the center of the circle of the second substrate, and the second connecting wire group is far from the center of the circle of the second substrate; the first and second connecting wire groups are concentric with the second substrate, and wires in the effective wire groups all point towards the center of the circle of the second substrate; the two effective wire groups in each coil are in opposite current directions, the two effective wire groups in each coil are in one-to-one correspondence to the positions of the two adjacent air gap magnetic fields, and adjacent air gap magnetic fields point towards opposite directions; and the adjacent effective wire groups of two coils are in a consistent current direction, and located in the same air gap magnetic field.

8. The horizontal axial angular vibration device according to claim 5, wherein the second magnetic circuit assembly comprises a first magnetizer arranged on a mounting base, a second magnetizer matched with the first magnetizer, a first magnetic steel arranged on the first magnetizer, a second magnetic steel arranged on the second magnetizer, and a second air gap formed between the first magnetic steel and the second magnetic steel; and the second magnetic circuit assembly is in clearance fit with the first magnetic steel and the second magnetic steel respectively.

9. The horizontal axial angular vibration device according to claim 8, wherein the number of the first magnetic steels is equal to the number of the second magnetic steels, and the first magnetic steel and the second magnetic steel are in one-to-one correspondence; the first magnetic steel and the second magnetic steel are of the same structure, multiple first magnetic steels and second magnetic steels enclose fan-shaped areas respectively, and the fan-shaped area enclosed by the first magnetic steel and the fan-shaped area enclosed by the second magnetic steel are coaxially arranged with the main shaft.

10. The horizontal axial angular vibration device according to claim 5, wherein multiple groups of the second driving components are provided, the multiple groups of the second driving components are symmetrically arranged at both ends of the main shaft, and two adjacent second driving components may share one magnetizer.

11. The horizontal axial angular vibration device according to claim 5, further comprising a centroid adjustment assembly, which is associated with the table surface and/or main shaft to adjust the overall centroid of the moving component to the axis of the main shaft.

12. The horizontal axial angular vibration device according to claim 11, wherein the centroid adjustment assembly is a second driving component, at this time at least two groups of the second driving components are provided, at least one group of the second driving components is used as a power source to drive the moving component to swing back and forth around a balance position, and the remaining second driving component is used for torque compensation.

13. The horizontal axial angular vibration device according to claim 1, further comprising a centroid adjustment assembly comprising a fixed balance block and one or more adjustable balance blocks arranged on the fixed balance block for adjustable balancing of heavy loads, wherein the centroid adjustment assembly is associated with the table surface and/or the main shaft to adjust the overall centroid of the moving component to the axis of the main shaft.

14. The horizontal axial angular vibration device according to claim 13, wherein at least two groups of the centroid adjustment assembly is provided, and the two groups of centroid adjustment assembly are spaced along the length direction of the main shaft, and symmetrically arranged relative to the table surface.

15. The horizontal axial angular vibration device according to claim 14, wherein the centroid adjustment assembly comprises the fixed balance block arranged on the table surface and an adjustable balance block arranged on the fixed balance block in a movable manner, and the fixed balance block is arranged in a reverse position where the centroid of the moving component deviates.

16. The horizontal axial angular vibration device according to claim 15, wherein the adjustable balance block and the fixed balance block are fixed by multiple fastening bolts and nuts, a guide groove is formed on one side surface of the fixed balance block in a direction away from the table surface, the guide groove is configured as a T-shaped groove, the large diameter end of a nut can slide inside the T-shaped groove, and the threaded section of a fastening bolt penetrates through the adjustable balance block and is connected to the nut.

17. The horizontal axial angular vibration device according to claim 1, further comprising a centroid adjustment assembly, which is associated with the table surface and/or main shaft to adjust the overall centroid of the moving component to the axis of the main shaft.

18. The horizontal axial angular vibration device according to claim 17, wherein the centroid adjustment assembly is a second driving component, and the second driving component is used for torque compensation; the second driving component is arranged in the middle of the main shaft, and comprises a second moving coil assembly mounted on the table surface or main shaft and a second magnetic circuit assembly matched with the second moving coil assembly; and the second moving coil assembly is mounted on the moving component, and the second magnetic circuit assembly is fixed to the base.

19. A horizontal axial angular vibration device, comprising a base;

a moving component, comprising a table surface for disposing a test equipment and a main shaft connected to the table surface to drive the table surface to rotate;

wherein:

further comprising:

a driving component, associated with the table surface and/or main shaft to drive the table surface to swing around the axis of the main shaft;

the axis of the main shaft is horizontally disposed;

wherein the driving component is a second driving component, and the second driving component is arranged in the middle of the main shaft, and comprises a second moving coil assembly mounted on the table surface or main shaft and a second magnetic circuit assembly matched with the second moving coil assembly; the second moving coil assembly is mounted on the moving component, and the second magnetic circuit assembly is fixed to the base; and when current is applied to the second moving coil assembly, under the action of an air gap magnetic field generated by the second magnetic circuit assembly, a compensating torque is generated on the second moving coil assembly to compensate for a gravitational moment on the moving component, wherein the compensating torque acts on the moving component in addition to the alternating driving torque generated on the first moving coil assembly.

US 12,693,190 B2

19

20

20. A horizontal axial angular vibration device, comprising a base;
a moving component, comprising a table surface for disposing a test equipment and a main shaft connected to the table surface to drive the table surface to rotate;
wherein:
further comprising:
a driving component, associated with the table surface and/or main shaft to drive the table surface to swing around the axis of the main shaft;
the axis of the main shaft is horizontally disposed;
wherein the horizontal axial angular vibration device further comprises a centroid adjustment assembly comprising a fixed balance block and one or more adjustable balance blocks arranged on the fixed balance block for adjustable balancing of heavy loads, wherein the centroid adjustment assembly is associated with the table surface and/or the main shaft to adjust the overall centroid of the moving component to the axis of the main shaft.

\* \* \* \* \*